M. L. ROBERTS.
Horseshoe

No. 167,789.          Patented Sept. 14, 1875.

Witnesses  
M. A. Proudfoot  
R. B. Reilly

Mark L. Roberts, Inventor  
By Connolly Ernst M Tighe Attorneys

N. PETERS, PHOTO-LITHOGRAPHER, WASHINGTON, D. C.

UNITED STATES PATENT OFFICE.

MARK L. ROBERTS, OF MANSFIELD, OHIO, ASSIGNOR OF TWO-THIRDS HIS RIGHT TO ELIJAH O. CASE AND WILLIAM R. NEWLON, OF SAME PLACE.

IMPROVEMENT IN HORSESHOES.

Specification forming part of Letters Patent No. 167,789, dated September 14, 1875; application filed March 13, 1875.

*To all whom it may concern:*

Be it known that I, MARK L. ROBERTS, of Mansfield, in the county of Richland and State of Ohio, have invented certain new and useful Improvements on Horseshoes; and I do hereby declare the following to be a full, clear, and exact description of the invention, such as will enable others skilled in the art to which it pertains to make and use it, reference being had to the accompanying drawings, which form part of this specification, in which—

Figure 1:
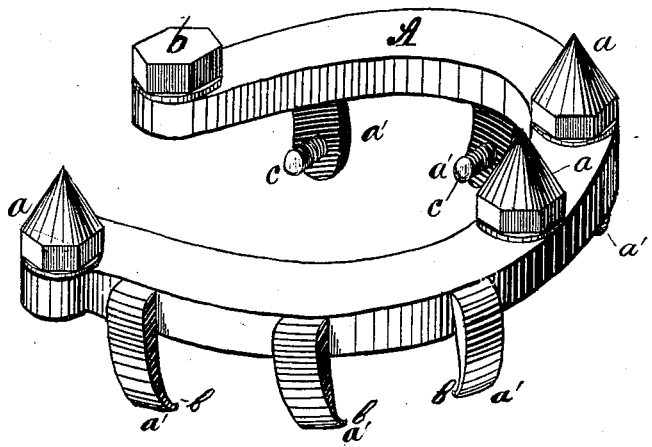
Figure 2:
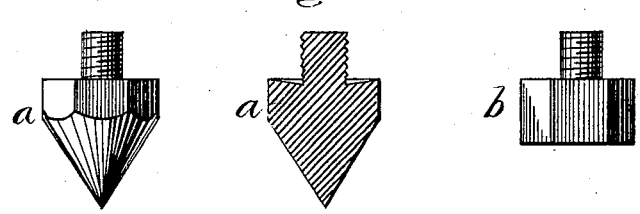

Figure 1 is a perspective view of the invention. Fig. 2 is an elevation, section, and modification of the detachable calk.

This invention relates to horseshoes; and consists in making the calks adjustable to the shoe, both the toe and heel, and in making two calks on the toe, for purposes to be shown, and in providing the shoe with clamps, whereby it may be set without nails, or may be used as an overshoe on smooth plates. I form the shoe with four bosses, slightly countersunk on their face, so as to give a firm grip to the calks. These bosses are situated one at each heel and two at the toe, apart about a distance equal to the length of the ordinary calk. Into these centrally I tap screw-threads, and insert the calks threaded correspondingly, and of a conical or other form on the ground side, with a polygonal shoulder, slightly concave on its bearing-surface. The purpose of this form of shoulder is to adapt it to a wrench. The object of two toe-calks is to prevent side slipping of the foot on a smooth surface or side-hill, as well as to give room for a nail or two in the toe, where nails are especially to be desired in nailed shoes.

The clamps consist of lugs extending upward and slightly inward from the outside top edge of the shoe, and conforming to the outline of the hoof. One clamp is bent inward, and terminates in small teeth or prongs to catch in the hoof, while its opposite one has a screw to enter the hoof a short distance, and thus rigidly fasten the shoe. The alternate arrangement and number of these lugs may be varied at will of manufacturer.

This form is peculiarly adaptable to a horse with sore or tender feet. Where frequent shoeing, and consequent laceration of the hoof by nails, makes the hoof incapable of firm shoeing, this form is very advantageously available.

Where the horse has good shoes, which would be a loss to remove, and yet must be sharpened to avoid slipping, this, as a temporary overshoe, offers an economical method of calking for the winter.

The detachable calks, being easily ground or sharpened at a nominal cost, may be attended to daily; or two sets may be used, one set sharpening while the other is using, thus providing perpetually-sharpened calks without the necessary loss of time and money through the otherwise imperative services of the farrier.

In the drawings herewith, A is the shoe, which may be with or without the clamps, $a$ representing the calks, and $a'$ the clamps, with screws $c$. The summer calk is shown by $b$.

Having fully described my invention, what I claim is as follows:

1. In combination with the horseshoe A, the calks $a$, having their faces countersunk, substantially as described.

2. In combination with the base A of a horseshoe, the fastening-lugs on opposite sides, provided, respectively, with the horizontal inwardly-projecting screws $c$, and the inwardly-projecting flanges $a'$, whereby said shoe may be fastened and unfastened by merely turning the screws against the side of the hoof, substantially as described.

In testimony that I claim the foregoing I have hereunto set my hand this 4th day of March, 1875.

MARK L. ROBERTS.

Witnesses:
F. J. McTIGHE,
A. CORCORAN.